July 25, 1933.  S. J. NOGOSEK  1,919,525
MOTOR CONTROL SYSTEM
Filed June 30, 1932
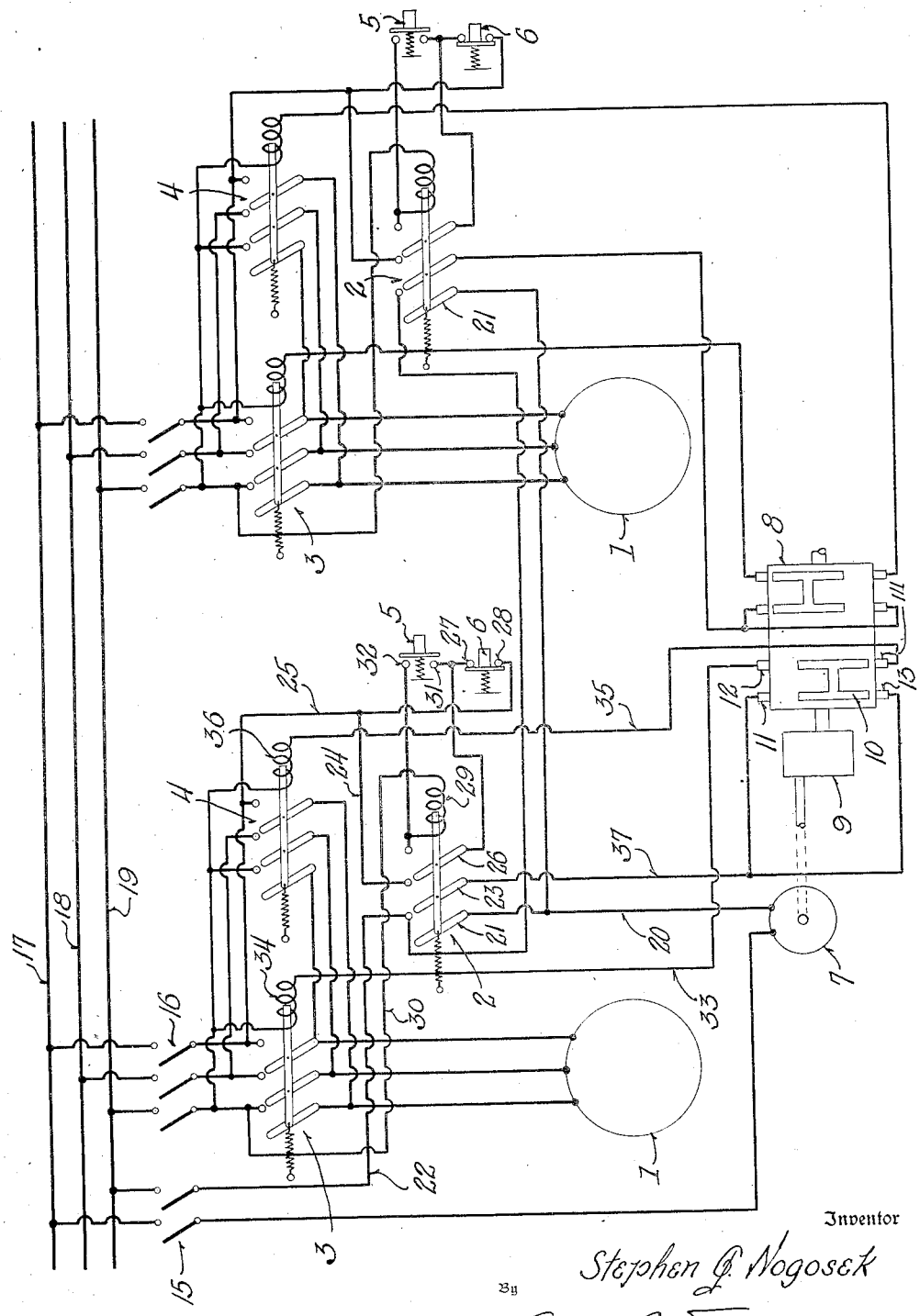
Inventor
Stephen J. Nogosek
By Austin R. Woolfolk, Attorney Patented July 25, 1933

1,919,525

UNITED STATES PATENT OFFICE

STEPHEN J. NOGOSEK, OF WEST ALLIS, WISCONSIN, ASSIGNOR TO SQUARE D COMPANY, OF DETROIT, MICHIGAN

MOTOR CONTROL SYSTEM

Application filed June 30, 1932. Serial No. 620,056.

This invention relates to a motor control system, and is particularly directed to a system for automatically controlling the reversing of one or more motors, and is primarily directed to the controlling of laundry machines although it is not limited to such use.

Objects of this invention are to provide a novel form of motor control, in which a pilot motor is started whenever one or more of the machines is in operation, in which the pilot motor automatically controls the alternate reversing of one or more motors, and is automatically stopped if all of the machines are shut down, thereby saving unnecessary operation of the pilot motor and providing considerable convenience for the operator, as it frequently happened heretofore that pilot motors have been allowed to continue operating when all of the laundry machines are shut down.

Further objects are to provide a system of motor control in which a forward and reversing controller is provided for each main motor, which are in turn controlled by a pilot motor, a starting button or switch and a stop button or switch being provided for each main unit, and the arrangement being such that the forward and reversing controllers do not operate for any given unit until the starter button is depressed for that particular unit, thereby avoiding needless operation of the forward and reversing controllers in the event that that particular unit is not in actual operation, and to so organize the system that any number of main units may be interconnected in a very simple and eminently practical manner.

An embodiment of the invention is shown in the accompanying drawing, in which:—

The single view is a schematic disclosure of the invention as applied to two main units.

Referring to the drawing, it will be seen that two main units have been disclosed although obviously any number of units may be employed, as will become more apparent as the description proceeds. Each unit is provided with a main motor 1 and a main controller indicated generally at 2, a forward controller indicated generally at 3, a reversing controller indicated generally at 4, a starting button or switch 5, and a stop button or switch 6. It is usual to mount the controllers 2, 3 and 4 upon a panel and to locate the start and stop buttons in a convenient position, the units being duplicated as successive machines are provided. A pilot motor 7 drives the reversing drum 8 through reduction mechanism 9 of any suitable type. The reversing drum may be formed in any manner desired and may consist of a plurality of groups of interconnected contacts 10 carried by the insulating drum and adapted to successively connect the upper brushes 11 and 12 or the lower brushes 13 and 14.

For the sake of clearness, the main reference characters only have been transposed to the second unit, the detailed reference characters being omitted.

A cut-out switch 15 is provided for the pilot motor 7 and a cut-out switch 16 is provided for all of the main motors 1, these switches 15 and 16 completely cutting off all supply of current from the mains 17, 18 and 19 either to the main motors or to the pilot motor 7. They normally remain closed and are open only when the entire device is idle.

One side of the pilot motor is normally connected to the main 17. Its other side is connected by means of the conductor 20 to a pole 21 of the main controller 2, and when such controller is closed, is connected through the conductor 22 to the main 19. The second arm 23 of the main controller 2 is connected to the brushes 11 and 13 and when the controller is closed, connects such brushes through the conductors 24 and 25 to the main 17. The third arm 26 of the main controller 2 is connected through the contacts 27 and 28 of the stop switch 6 to the main 17, and when it is closed, connects one side of the holding coil 29 to such main 17, the other side of the holding coil 29 being connected through the conductor 30 to the main 19.

The starting switch or button 5 has one of its contacts 31 connected through the stop switch and the conductor 25 to the main 17. Its other contact 32 is connected through the holding coil 29 and the conductor 30 to the main 19, so that when the starter button is depressed, the holding coil 29 is energized and the main controller 2 closes. When this controller closes, it maintains its own holding circuit as it connects one side of the holding coil 29 through the stop switch and the conductor 25 to the main 17, the other side of such holding coil being connected through the conductor 30 to the main 19.

The brush 12 of the reversing drum is connected through the conductor 33 to one side of the holding coil 34 of the forward controller 3. The other side of the holding coil 34 is connected to the main 19.

The other brush 14 of the reversing drum is connected through the conductor 35 to one side of the holding coil 36 of the reversing controller 4. The other side of the holding coil 36 is connected to the main 19.

It is thus apparent that as the reversing drum rotates, first one brush 12 and then the other brush 14 will be connected to the brushes 11 or 13, respectively, and from there through the conductor 37, the main controller arm 23, the conductors 24 and 25, to the main 17, and thus will alternately close the circuits of and thereby energize the holding coils 34 and 35 of the forward and reversing controllers 3 and 4 respectively, thus alternately causing such controllers to operate. This will cause first a forward rotation and thereafter a reverse rotation of the main motor 1. However, as soon as the stop button 6 for this particular unit is depressed, it is apparent that the circuit of the holding coil 29 is opened and the main controller 2 for this unit opens.

On the other hand, if the starting button 5 is depressed, the circuit for the holding coil 29 of the main controller 2 is completed and the main controller closes, thereby causing the alternate forward and reverse operation of the main motor 1 in a manner hereinbefore described.

It is to be noted particularly that when the main controller 2 of any unit is opened, that the forward and reversing controllers of such unit do not operate, although the reversing drum 8 may be in continuous rotation.

It is to be noted also that the circuit of the pilot motor 7 includes the arm 21 of each of the main contactors 2 of the several units, so that if any unit is in operation, the pilot motor is also in operation, but in the event that all of the units are stopped, the pilot motor circuit is automatically opened and it is therefore stopped, thereby avoiding needless operation of the pilot motor and pilot drum.

On the other hand, if any starting button or switch 5 is closed, the pilot motor immediately starts operating and continues until all units are shut down.

It will be seen that a novel form of motor control for controlling the automatic reversing of motors through the medium of a pilot motor has been provided, in which the forward and reversing controllers of any given unit do not operate until this particular unit is itself in operation, and also that the pilot motor is automatically stopped whenever all of the main units are shut down.

Although this invention has been described in considerable detail, it is to be understood that such description is intended as illustrative rather than limiting, as the invention may be variously embodied and is to be interpreted as claimed.

I claim:

1. A system of motor control comprising a plurality of main motors, a pilot motor, mechanism driven from said pilot motor for controlling said main motors and causing the operation of each main motor in alternate directions, and starting and stopping means for each main motor, said stopping means acting to stop said pilot motor when no main motor is operating.

2. A system of motor control comprising a plurality of main motors, a main controller for each main motor for starting and stopping such main motor, a pilot motor, and reversing means for each main motor driven from said pilot motor, said pilot motor being controlled jointly by each main controller, whereby when all main controllers are open said pilot motor is stopped.

3. A system of motor control comprising a plurality of main motors, reversing means for said main motors, a pilot motor for driving said reversing means, and a main controller for each main motor, each main controller having contacts connected in parallel for controlling said pilot motor, whereby when no main motor is in operation said pilot motor is stopped.

4. A system of motor control comprising a plurality of main motors, reversing means for said main motors, a pilot motor for driving said reversing means, a main controller for each main motor, each main controller having contacts connected in parallel for controlling said pilot motor, whereby when no main motor is in operation said pilot motor is stopped, and a starting and stop switch for each main controller.

5. A system of motor control comprising a plurality of main motors, a main controller for each main motor, a forward and a reverse controller for each main motor for controlling its direction of rotation, reversing means controlling the opening and closing of said forward and reverse controllers, and a pilot motor for driving said reversing means, said main controllers having contacts connected in parallel for controlling said pilot motor.

6. A system of motor control comprising a plurality of main motors, a main controller for each main motor, a forward and a reverse controller for each main motor for controlling its direction of rotation, reversing means controlling the opening and closing of said forward and reverse controllers, a pilot motor for driving said reversing means, said main controllers having contacts connected in parallel for controlling said pilot motor, the main controller and the forward and reverse controller remain open except when the corresponding main motor is operating, irrespective of the operation of any other main motor.

STEPHEN J. NOGOSEK.